Figure 1:
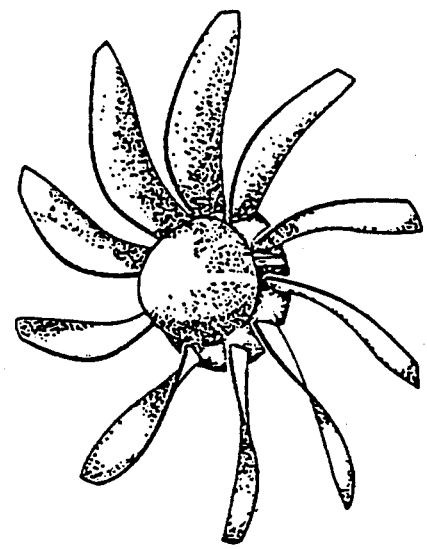

United States Patent [19]

Parry et al.

[11] Patent Number: 4,969,800
[45] Date of Patent: Nov. 13, 1990

[54] OPEN ROTOR BLADING

[75] Inventors: Anthony B. Parry, Derby; David G. Crighton, Cambridge, both of England

[73] Assignee: Royce-Royce plc, London, England

[21] Appl. No.: 378,791

[22] Filed: Jul. 12, 1989

[30] Foreign Application Priority Data

Jul. 13, 1988 [GB] United Kingdom ............... 8816656

[51] Int. Cl.$^5$ ............................................. B64C 11/16
[52] U.S. Cl. ............................ 416/238; 416/DIG. 2; 416/DIG. 5
[58] Field of Search ............... 416/238, 228, DIG. 2, 416/DIG. 5, 500, 223 R, 223 A, 234; 415/181, 119

[56] References Cited

U.S. PATENT DOCUMENTS

| | | | |
|---|---|---|---|
| 4,073,601 | 2/1978 | Kress | 416/242 |
| 4,459,083 | 7/1984 | Bingham | 416/DIG. 2 |
| 4,569,633 | 2/1986 | Flemming, Jr. | 416/DIG. 2 |
| 4,652,213 | 3/1987 | Thibert et al. | 416/DIG. 2 |
| 4,773,825 | 9/1988 | Rodde et al. | 416/DIG. 2 |

FOREIGN PATENT DOCUMENTS

| | | |
|---|---|---|
| 0227524 | 11/1986 | European Pat. Off. |
| 299387 | 10/1927 | United Kingdom |
| 312482 | 5/1928 | United Kingdom |
| 459206 | 6/1936 | United Kingdom |
| 625154 | 1/1947 | United Kingdom |
| 1599633 | 2/1977 | United Kingdom |
| 2170868 | 8/1986 | United Kingdom |
| 2197913 | 11/1987 | United Kingdom |

OTHER PUBLICATIONS

D. B. Hanson, "Helicoidal Surface Theory for Harmonic Noise of Propellers in the Far Field", AIAA Journal, vol. 18, 2/1980, pp. 1213-1220.

F. B. Metzger & C. Rohrbach, "Benefits of Blade Sweep for Advanced Turboprops", AIAA Paper 85-1260, Jul. 1985.

D. B. Hanson, "Influence of Propeller Design Parameters on Far Field Harmonic Noise in Forward Flight", AIAA Journal, vol. 18, 5/1980, pp. 1313-1319.

C. K. W. Tam, "On Linear Acoustic Solutions of High Speed Helicopter Impulsive Noise Problems", Journal Sound & Vib., vol. 89(1), pp. 119-134, Sep. 1982.

*Primary Examiner*—John T. Kwon
*Attorney, Agent, or Firm*—Cushman, Darby & Cushman

[57] ABSTRACT

To reduce the noise levels of open rotor devices rotating at supersonic tip speeds, a combination of blade sweep and aerofoil profile is employed. The sweep of the blade extends through the sonic radius, and in the region of the sonic radius the section comprises a leading edge profile with a rounded nose conforming essentially to the formula $$T \sim x_L{}^{a_L}$$

where T is the blade thickness
$x_L$ is the distance from the front of the leading edge
$a_L$ is an algebraic power greater than $\tfrac{3}{4}$ and less than 1.

The leading edge profile extends 2-15% of the aerofoil chord and has a nose radius not greater than 2% of the chord. It can be shown that, by these measures, it is possible to moderate the perceived noise levels from a device such as an aircraft propeller rotating at supersonic tip speeds.

5 Claims, 1 Drawing Sheet

OPEN ROTOR BLADING

This invention relates to rotary bladed devices for operation in a compressible fluid, such devices including propellers, rotors and radial fans. It relates in particular to open rotor devices whether for propulsion or lift, that are arranged to be driven at supersonic tip speeds, and is concerned with the reduction of noise radiation from such devices.

Whereas the noise radiated from ducted fans can be controlled to some extent by choice of acoustic linings for their ducts, that measure is not available for blading that has to operate in free air, such as propellers or rotors for the propulsion and lift of aircraft.

The advent of propellers intended to operate at supersonic tip speeds has made the problem of noise nuisance worse. It has been found that the sweep given to the blades of such propellers for aerodynamic purposes has some moderating effect, this being most marked on the supersonic region of the blading, but it cannot be regarded as a solution having regard to the general increase of noise levels in supersonic regimes.

The need for reducing of noise emission remains pressing, therefore, but the use of theory to solve this problem has met the obstacle that the mathematical formulae that predict the noise radiation pattern are so extremely complex as to defy analysis for this purpose. For an exposition of the theoretical background, reference can be made to "Helicoidal Surface Theory for Harmonic Noise of Propellers in the Far Field", D B Hanson, AIAA Journal, Vol. 18, 1980, pages 1213-1220.

It has been noted by workers in open rotor acoustics ("Benefits of Blade Sweep for Advanced Turboprops", F B Metzger and C Rohrbach, AIAA Paper 85-1260, 1985, and "Influence of Propeller Design Parameters on Far Field Harmonic Noise in Forward Flight", D B Hanson, AIAA Journal, Vol. 18, 1980, pages 1313-1319) that the presence of high acoustic pressures or singularities in the underlying equations for the noise emission are indicative of high noise levels. This latter Hanson reference indicates that the effect of sweep is to reduce the singularities from the supersonic region of a blade and also shows that blade sweep produces its beneficial effect by dephasing the noise signals radiating from different portions of the blade.

It has also been noted ("On Linear Acoustic Solutions of High Speed Helicopter Impulsive Noise Problems", C K W Tam, J.Sound Vib, Vol. 89(1), pages 119-134) that singularities develop as operating conditions move into the transonic range, and that a blunt leading edge in a transonic region of the blade is a specific source of a singularity. Tam suggests that a biconvex aerofoil profile would avoid that result, but such a solution has no practical application, since a propeller blade having a sharp leading edge would have too brief a working life.

It has now been found that there is a zone substantially at the sonic radius of a rotating blade which, in the prior art designs, is responsible for a high level of noise radiation because of a singularity, but that it is possible to shape this region of the blade to reduce the perceived noise level significantly without resort to a sharp leading edge.

According to the invention, in a rotary bladed device having a plurality of equispaced, swept-back blades and arranged for rotation at a supersonic tip speed, the sweep of each blade extending through a region intermediate the blade tip and root lying at a sonic radius, the blade section in the region of the sonic radius comprises a leading edge profile with a rounded nose conforming essentially to the formula, $$T \sim x_L{}^{a_L}$$

where T is the blade thickness;
$x_L$ is the distance from the front of the leading edge; and
$a_L$ is an algebraic power greater than $\frac{3}{4}$ and less than 1, the leading edge profile extends over at least 2% of the aerofoil chord and has a nose radius not substantially greater than 2% of the chord.

There is normally no practical need to avoid giving the blades sharp trailing edges. The trailing edge profile may conform to the same formula as the leading edge, but while exponent $a_L$ has the same bottom limit there is therefore theoretically no top limit. Preferably the blade section has a trailing edge in the form of a cusp (exponent $a_L$ greater than unity) for optimum reduction of far field radiation from that source.

When a blade moves through a fluid medium the noise generated can be attributed to two sources. Firstly, there is noise from the displacement of the fluid by the blade, known as "thickness noise". In addition, there is "loading noise" from the variations in pressure around the blade, these being primarily related to the lift that is generated.

The invention is based on the consideration that thickness noise is the predominant source at high speeds and makes use of the fact that high frequency radiation, up to about 10 Hz, is the most obtrusive to the human ear. If the low frequency content of the radiation is ignored, it is possible to reduce the complex equations already known to arrive at relatively simple formulae. These show firstly that at supersonic tip speeds noise radiation is dominated by the contribution from the sonic radius i.e. the radial station which moves with the sonic velocity, and secondly that only the leading and trailing edge portions of the blade section at that radial station are important in terms of noise radiation. Furthermore, the simplified formulae show the relationship between blade leading edge shape and loading and the radiated sound field.

Since the sonic radius in respect of any particular reference point is the radius at which the component of the blade velocity towards that point is the sonic velocity, for points offset from the plane of rotation of the blade there will be different sonic radii. However, the most important direction of noise propagation is in the plane of rotation and it is with respect to this direction that the sonic radius is determined at which the blade profile characteristics of the present invention are required. Radial stations further outboard represent the sonic radii for directions of propagation oblique to the plane of rotation and continuing the same profile characteristics through these stations can therefore make a further contribution to noise reduction.

A more detailed explanation will now be given, and in the mathematics that follow the symbols have the meanings given in the appendix to this specification.

If the normalized loading or thickness near the leading edge is defined by $$T(X) = a_L(X + \tfrac{1}{2})^{\nu_L} \qquad (1)$$

then the formulae given by Hanson in the AIAA Journal Vol. 18, pages 1213-1220 can be reduced, in the high frequency limit, relying on the lesser sensitivity of the human ear to sounds much below about 1000 Hz to $$p \sim \frac{z^*S(z^*)}{|mB|^{5/4}} \times \frac{\alpha_L \nu_L!}{|K_x|^{\nu_L+1}} \quad (2)$$

In (2) the sign "$\sim$" means proportional to in the high frequency limit, and S is a source strength term defined by $$S = M_r^2 k_x^2 b \quad (3)$$

for thickness noise, and $$S = M_r^2 K_y \frac{C_L}{2} \quad (4)$$

for loading noise.

The dimensionless chordwise wavenumbers $k_x$ and $k_y$ are defined in the Hanson reference and it is important to note that they are each directly proportional to mB.

By the use of standard Fourier transform techniques (e.g. see "Fourier Analysis and Generalised Functions", M J Lighthill, Cambridge University Press, 1958), it is possible to show that no singularities will be generated if $$\nu_L > \tfrac{3}{4} \quad (5)$$

for thickness noise, and $$\nu'_L > -\tfrac{1}{4} \quad (6)$$

for loading noise.

To satisfy the condition of equation (5), and bearing in mind that a sharp leading edge ($\nu_L = 1$) is to be avoided, the requirement can be expressed as $$\tfrac{3}{4} < \nu_L < 1 \quad (7)$$

that is to say, the aerofoil section can be given a rounded leading edge within this defined range without generating singularities.

If equation (6) is satisfied, in particular if $$-\tfrac{1}{4} < \nu'_L < 0 \quad (8)$$

then the aerofoil will be heavily loaded at the leading edge but will not generate singularities.

To have effect, the profiles defined by the criteria of (5) and (6) are required to be maintained over a distance of between 2% and 15% of the aerofoil chord from the front of the leading edge. Chord length scales of less than 2% in terms of wavelengths correspond to frequencies above 10000 Hz and will therefore have little or no influence on perceived noise; a nose radius no greater than 2% of chord length is thus required if only frequencies above 10000 Hz are to remain uninfluenced. On the same criterion, the minimum of 2% of chord length is set for maintaining the prescribed profile (a minimum which would of course only be combined with a significantly smaller nose radius). The chord length scale of 15% corresponds to a frequency of about 1000 Hz, so that extending the profile to 15% of the aerofoil chord will reduce the propagation of the range of frequencies between 10000 Hz and 1000 Hz. It will generally not be required to continue the profile any further since the human ear is less responsive to frequencies below 1000 Hz.

As a further factor, although it has been found that conditions at the sonic radius are a major source of perceived noise, as indicated above it is possible to obtain a further noise reduction if the specified profile is continued spanwise from the sonic radius to or nearly to the blade tip because of the change of position of the sonic radius for points of observation at different angles of obliquity to the plane of rotation.

At the trailing edge, similar considerations apply, except that it is not necessary to round the edge. As already stated, a cusp-like form can therefore be adopted as the optimum for noise reduction. Between these nose and tail regions the aerofoil section profile can be optimized on other considerations.

The minimum sweep angle required for beneficial effects to be obtained is set by two criteria namely:

$$\frac{M_t \left( \tan \Lambda^* - 2z^* M_t^2 \left( \frac{s^*}{D} \right) \right)}{(1 - M_x \cos\theta)} > (1 - z^{*2})^{\frac{1}{2}} \quad (9)$$

$$\frac{M_t \left( \tan \Lambda^* - 2z^* M_t^2 \left( \frac{s^*}{D} \right) \right)}{(1 - M_x \cos\theta)} > (mB)^{-1/6} \quad (10)$$

In (9) the sweep angle is related to the normalized sonic radius, and in (10) to the blade passing frequency. Subject to the minimum conditions set by these two criteria, the blade sweep can be determined from aerodynamic considerations and these will generally give a sweep that increases with radial station as in known forms of blading.

It will be seen that the criteria set out in (9) and (10) are dependant upon $M_t$ and $M_x$, i.e., the minimum sweep angle required will vary in different flight conditions. A further variable is the minimum frequency noise emission which is to be influenced, the minimum sweep angle increasing if a lower frequency is chosen.

By way of illustration, the following table shows the minimum sweep angles set by each criterion at different combinations of $M_t$ and $M_x$. For the purpose of this table, the minimum frequency to be influenced has been chosen as 1000 Hz and the angle $\theta$ corresponds to a observation locus in the plane of the propeller and travelling forwards with the propeller.

| | $M_x$ | | | | | | | |
|---|---|---|---|---|---|---|---|---|
| | 0.25 | | 0.7 | | 0.8 | | 0.9 | |
| $M_t$ | (9) | (10) | (9) | (10) | (9) | (10) | (9) | (10) |
| 0.6 | | | | | | | 12.3 | 8.7 |
| 0.7 | | | | | 14.8 | 14.7 | 12.0 | 7.7 |
| 0.8 | | | 16.0 | 18.3 | 16.6 | 13.2 | 11.3 | 6.9 |
| 0.9 | | | 19.0 | 16.7 | 16.6 | 12.0 | 10.5 | 6.2 |
| 1.0 | 13.2 | 27.3 | 19.6 | 15.4 | 16.1 | 11.0 | 9.7 | 5.7 |
| 1.1 | 22.0 | 25.5 | 19.4 | 14.3 | 15.3 | 10.2 | 9.0 | 5.3 |
| 1.2 | 24.8 | 23.9 | 18.9 | 13.3 | 14.6 | 9.5 | 8.4 | 4.9 |

The blank spaces on the table correspond to operating regions in which the propeller is subsonic, in which conditions of course the present invention is not applicable. The lowest $M_x$ of 0.25 has been chosen to represent take-off conditions while the remaining value represent typical cruise conditions.

For each combination of $M_t$ and $M_x$ it is required for the sweep angle at the sonic radius to be at least as large as the greater of the two different values set by the criteria (9) and (10). The table indicates that in the range of $M_t$ and $M_x$ relating to cruise conditions it is usually equation (9) that sets the minimum sweep angle but at the lower Mach numbers of take-off conditions $M_x$ may be the dominant criterion. The minimum sweep angle increases as Mach number reduces but, at the same time, the sonic radius will move further towards the tip.

Figure 2:
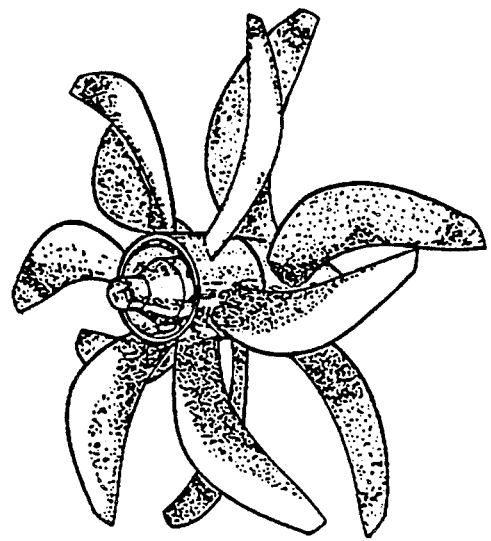
Figure 3:
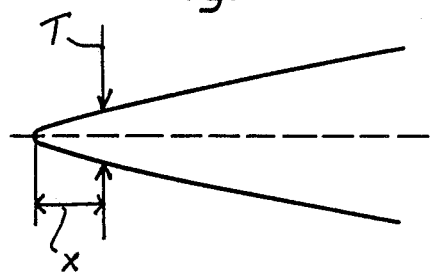
Figure 4:
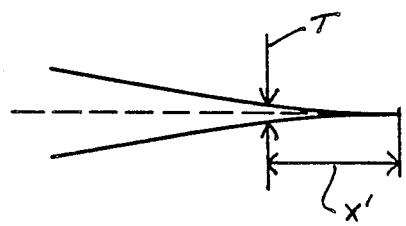

The accompanying drawings illustrate examples of aircraft propellers which incorporate the invention, FIGS. 1 and 2 illustrating a single disc tractor propeller and a counter-rotating pusher propeller respectively, and FIGS. 3 and 4 illustrating the leading edge and trailing edge cross-sections of a blade in the propellers of FIG. 1 or FIG. 2 in a plane parallel to the axis of rotation of the propellers.

FIG. 1 shows a known configuration of high speed propeller with a series of equispaced blades radiating from a rotary hub. As is known for operation at supersonic tip speeds, the blades are swept back relative to their path of travel at an angle that increases from the root of the blade. FIG. 2 similarly shows swept back blades mounted on two counter-rotating hubs, as viewed from the rear.

In FIG. 3 the blade leading edge profile is shown based upon a planar center line and conforming to the formula $T \sim X^{\frac{1}{2}}$, T being the blade thickness and X being the distance from the leading edge nose. This profile continues over 2% to 15% of the chord. While the nose is rounded, its radius is below the limit of 2% of the chord length.

The trailing edge profile shown in FIG. 4 is similarly based upon a planar center line and shows a cusplike profile in which the thickness T at any station along the chord line is proportional to the distance X' of that station from the trailing edge tip raised to a power greater than 1.

The profiles of FIGS. 3 and 4 are present at the sonic radius, as determined in the plane of rotation of the blade, and are maintained over at least a substantial radial extent of the blade between that radius and the blade tip.

Aircraft propulsion units are of course operated over a wide range of conditions but at take off and landing speeds the flow over a propeller blade will generally be subsonic. At least in commercial aircraft, therefore, the significant operating condition is the cruise flight level which will be maintained with very little variation, so that the sonic radius of the propeller is predetermined relatively precisely.

LIST OF SYMBOLS

| | |
|---|---|
| b | max. thickness/chord ratio at the local radius |
| B | number of blades |
| c | chord |
| $C_L$ | lift coefficient |
| D | propeller diameter |
| $k_x$ | wavenumber $\dfrac{2mBM_t \left(\frac{c}{D}\right)}{(1 - M_x \cos \theta)M_r}$ |
| $k_y$ | wavenumber $\dfrac{2mB \left(\frac{c}{D}\right)(M_r^2 \cos \theta - M_x)}{zM_r(1 - M_x \cos \theta)}$ |
| m | harmonic of blade passing frequency |
| $M_r$ | blade relative Mach number $(M_x^2 + z^2 M_t^2)^{\frac{1}{2}}$ |
| $M_t$ | tip rotational Mach number |
| $M_x$ | flight Mach number |
| s | distance blade has been swept back along a helical path |
| S | source strength - see (3) and (4) |
| X | coordinate measured parallel to the local chord with origin at the mid-chord and normalized by the local chord |
| z | local blade radius normalized by the tip radius |
| $a_L$ | relates to chordwise source strength distribution - see (1) |
| $\theta$ | angle of observation to propeller flight axis |
| $\Lambda$ | local blade sweep angle |
| $\nu_L$ | algebraic power in chordwise source strength distribution - see (1) |
| ( )* | evaluated at the sonic radius |

We claim:

1. A bladed rotor having a plurality of equispaced, swept-back blades and arranged for rotation at a supersonic tip speed, the sweep of each blade extending through a region intermediate the blade tip and root lying at a sonic radius, the blade section in the region of the sonic radius comprising a leading edge profile with a rounded nose conforming essentially to the formula, $$T \sim x_L{}^{a_L}$$

where T is the blade thickness,
$x_L$ is the distance from the front of the leading edge, and
$a_L$ is an algebraic power greater than $\frac{3}{4}$ and less than 1; said leading edge profile extending over at least 2% of the aerofoil chord and having a nose radius not substantially greater than 2% of the chord.

2. A bladed rotor according to claim 1 wherein said blade section in the region of the sonic radius comprises a cusp-form trailing edge.

3. A bladed rotor according to claim 1 wherein said blade section is maintained over at least a substantial part of the blade between said sonic radius and the blade tip.

4. A bladed rotor according to claim 1 wherein said leading edge profile extends over not substantially more than 15% of the aerofoil chord.

5. A bladed rotor having a plurality of equispaced, swept-back blades and arranged for rotation at a supersonic tip speed, the sweep of each blade extending through a region intermediate the blade tip and root lying at a sonic radius, the blade section in the region of the sonic radius comprising a leading edge profile with a rounded nose conforming essentially to the formula, $$T \sim x_L{}^{a_L}$$

where T is the blade thickness,
$x_L$ is the distance from the front of the leading edge, and
$a_L$ is an algebraic power greater than $\frac{3}{4}$ and less than 1;

said leading edge profile extending over at least 2% of the aerofoil chord and having a nose radius not substantially greater than 2% of the chord, wherein the blade sweep angle is not less than that required to maintain the following two relationships, namely, $$\frac{M_t\left\{\tan \Lambda^* - 2z^*M_t^2\left(\frac{s^*}{D}\right)\right\}}{(1 - M_x \cos\theta)} > (1 - z^{*2})^{\frac{1}{2}}$$

$$\frac{M_t\left\{\tan \Lambda^* - 2z^*M_t^2\left(\frac{s^*}{D}\right)\right\}}{(1 - M_x \cos\theta)} > (mB)^{-1/6}$$

the former relationship relating the sweep angle to the normalized sonic radius z and the latter relationship relating the sweep angel to the blade passing frequency mB, where $M_t$ is the blade tip rotational Mach number,
$M_x$ is the Mach number of the rotor in a direction at right angles to the planes of rotation of the rotary blades,
s* is the distance the blade has been swept back along a helical path,
D is the diameter of the path swept out by the blade tips,
Θ is the angle of observation relative to a direction at right angles to the planes of rotation at the rotary blades,
m is an harmonic of the blade passing frequency, and
B is the number of blades on the rotor,
z* local blade radius normalized by the tip radius,
Λ* local blade sweep angle.

* * * * *